Sept. 21, 1937.  A. B. WERDEHOFF  2,093,499
GRILLE
Filed Nov. 19, 1934   2 Sheets-Sheet 1
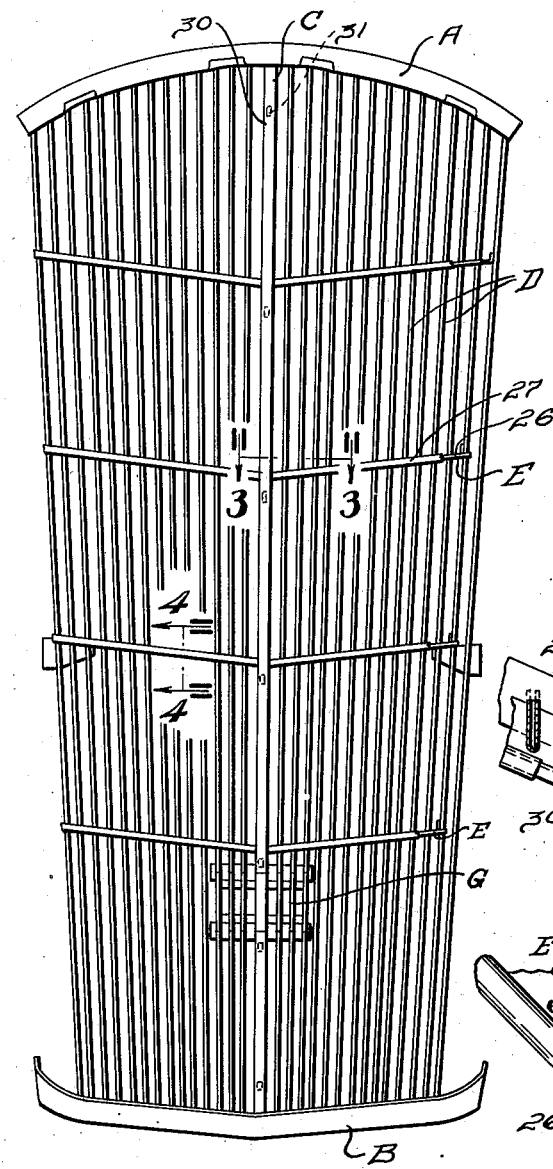
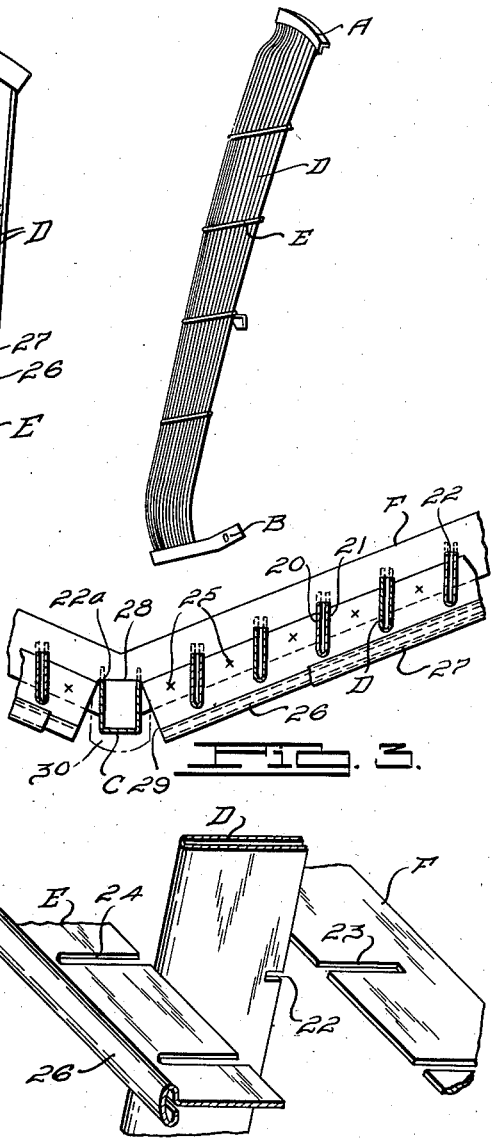
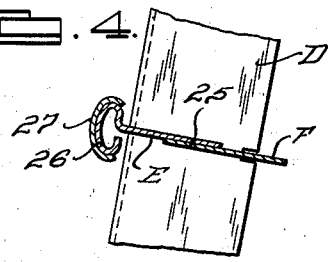
INVENTOR.
Albert B. Werdehoff.
BY
ATTORNEYS.

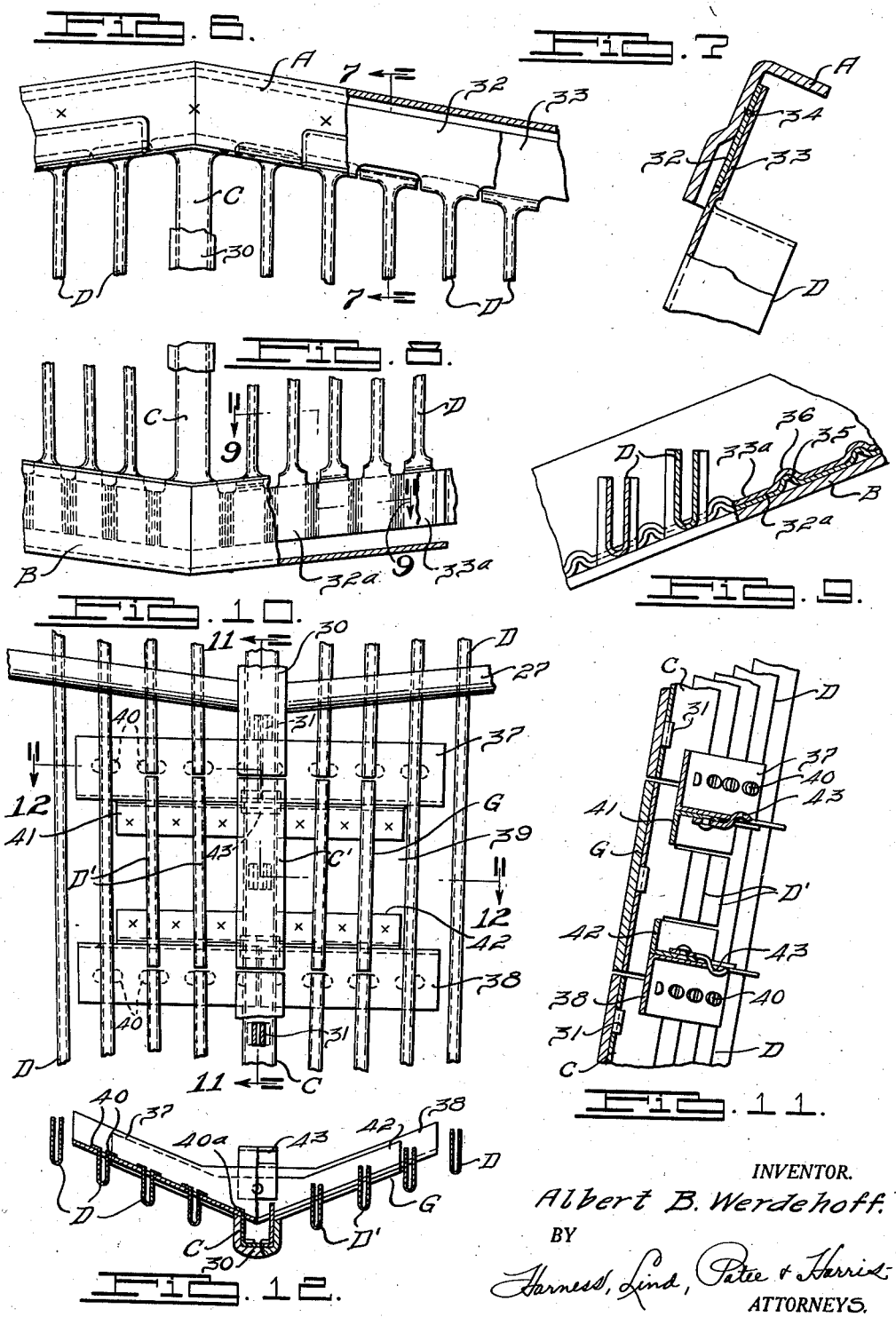

Patented Sept. 21, 1937

2,093,499

UNITED STATES PATENT OFFICE 2,093,499

GRILLE

Albert B. Werdehoff, Lake Orion, Mich., assignor to Chrysler Corporation, Detroit, Mich., a corporation of Delaware Application November 19, 1934, Serial No. 753,627

13 Claims. (Cl. 293—54)

This invention relates to grilles and refers more particularly to improvements in grille structures adapted to provide a front facing for motor vehicle radiators.

One object of my invention is to provide a grille structure having improved qualities of strength, low manufacturing cost, ease of manufacture and assembly.

A further object of my invention is to provide a grille having its component members secured together in an improved manner.

Further objects and advantages of my invention will be more apparent hereinafter, reference being had to the accompanying drawings illustrating one embodiment of my invention and in which:

Fig. 1 is a front elevational view of my grille.

Fig. 2 is a side elevational view thereof on a reduced scale.

Fig. 3 is an enlarged sectional view along the line 3—3 of Fig. 1.

Fig. 4 is a detail sectional view along the line 4—4 of Fig. 1.

Fig. 5 is a detail perspective view of the grille members shown in Fig. 4.

Fig. 6 is an enlarged front elevational view of a portion of the top of the grille with parts thereof broken away to illustrate the structure.

Fig. 7 is a detail sectional view along the line 7—7 of Fig. 6.

Fig. 8 is a view similar to Fig. 6 but at the bottom portion of the grille.

Fig. 9 is a detail sectional view along the line 9—9 of Fig. 8.

Fig. 10 is an enlarged front elevational view of the crank receiving portion of the grille.

Fig. 11 and Fig. 12 are detail sectional views respectively along the lines 11—11 and 12—12 of Fig. 10.

In the drawings reference character A represents the top relatively heavy or strong lateral frame member, B the corresponding bottom member, and C the vertical central relatively strong bar or rib.

Extending generally vertically between frame members A and B are a laterally spaced series of bars D crossed at vertically spaced points by the generally laterally extending front bars E and companion rear bars F.

The bars D are return bent metal stampings preferably of U-shape in cross-section as viewed in Fig. 3, the laterally separated side portions 20, 21 thereof being relatively long and presenting rear faces notched at 22. The rear bars F and the front bars E are preferably in the form of relatively thin plates, these bars each having laterally spaced notches 23 and 24 respectively. As best shown in Figs. 3, 4, and 5 the notches 22 and 23 are adapted for registration, with portions of the rear bar F at the sides of notch 23 engaging the side portions 20 and 21 of each of the vertical bars D while the upper and lower edges of the bars D bounding the notches 22 engage the upper and lower faces of the associated bars F rearwardly of the notches 23 thereof.

The front bars E have their notches 24 opening rearwardly to closely receive the vertical bars D with the sides of the notches 24 engaging the side portions of the vertical bars, the oppositely extending vertical bar engaging portions of the bars E and F contacting in overlapping relationship as shown in Fig. 4. These overlapping portions are preferably secured together as by welding at suitable points or spots 25 whereby the front and rear bars are fixed securely together and with the vertical bars D by reason of the engaged notches 22, 23, and 24. The lateral front bars E terminate forwardly in the relatively wide bent beads 26 and while these beads may form the outer finish surface of the front bars, I preferably secure to the beads 26 a finish strip or member 27 adapted for attachment either by springing the same on the bead or else by sliding the same inwardly. The central vertical bar C is also provided with notches 22ª for receiving the notched central portion 28 of each of the rear bars F, the latter preferably extending across the grille for substantially the whole width thereof. As best shown in Fig. 3 the bars E and F may be inclined outwardly and rearwardly from the central bar C to space the inner edges 29 of the front bars E from the sides of the vertical bar C sufficiently to receive the side portions of a finish strip or bar 30 secured to the central bar C although if desired the finish strip 30 may be omitted. Any suitable form of fasteners indicated in Fig. 1 at 31 may be employed to hold the finish bar 30 to the central bar C.

The vertical bars C and D are adapted to be rigidly secured to the top and bottom frame members A and B respectively as best shown in Figs. 6 to 9. Thus, the bars D may be integrally formed in pairs of stampings, each stamping having alternate bars D. These stampings comprise the top laterally extending plates 32 and 33 welded or otherwise secured together in face contact with each other as indicated at 34 in Fig. 7, these plates being also welded to the rear face of the top frame bar A. Fig. 6 best illustrates the manner in which the plates 32 and 33 are integrally formed with alternate bars D. The central bar C is preferably formed as a unit with one of the plates 32 or 33 although, if desired, this central bar may be welded to the top bar A as a separate member.

At the bottom of the grille structure alternate bars D are likewise formed as a part of the bottom laterally extending plates 32ª and 33ª similarly welded together and at suitable points to the bottom frame member B. As shown in Fig. 9 the plates 32ª and 33ª have engaged or nested strengthening ribs 35 and 36 respectively, it being understood that if desired the companion plates of the ribs D may both be constructed as shown in Fig. 7 or Fig. 9.

In Figs. 10, 11, and 12 I have illustrated the manner in which a section of the grille structure may be removed to accommodate the cranking portion of a hand crank (not illustrated) since ordinarily it is desired to make provisions for the reception of a crank for starting the motor vehicle engine.

At a lower central region of the grille structure I have provided the relatively short lateral angle bars 37 and 38 for providing a reinforcement for the grille structure adjacent the crank receiving opening 39. The reinforcing bars 37, 38 are secured to certain of the vertical bars D adjacent the central bar C by reason of the laterally bent tongues 40 of the bars D, these tongues being passed through suitable openings in the reinforcing bars and then bent along the inner faces of the reinforcing bars for welding thereto. The central bar C is likewise formed with a corresponding pair of tongues 40ª for locking engagement with each of the reinforcing bars 37 and 38. G represents the removable grille portion to provide the opening 39 for the reception of the crank, this removable portion having relatively short vertical bars D' and C' respectively aligned with the interrupted ends of the vertical bars D and C so that in general appearance the vertical bars D and C extend continuously across the opening 39. The removable grille portion G is provided with the reinforcing angle bars 41, 42 adapted to slidably engage the reinforcing members 37 and 38. In order to removably secure the portion G normally in position to close the opening 39, the bars 41 and 42 are provided with spring fasteners 43 which are adapted to yieldingly spring behind the rear faces of the bars 37 and 38 as will be apparent from Fig. 11.

Various modifications and changes will be apparent from the teachings of my invention, as set forth in the appended claims and it is not my intention to limit my invention to the particular details of construction and operation shown and described for illustrative purposes.

What I claim is:

1. In a grille for a motor vehicle radiator, a plurality of laterally spaced substantially vertically extending bars, said vertical bars having a series of laterally aligned rearwardly opening notches in their rear faces, a laterally extending rear bar having a series of laterally spaced forwardly opening notches in its front face for registration in the notches of said vertical bars with portions of said rear bar adjacent the notches thereof engaging the sides of said vertical bars, and a laterally extending front bar having a series of laterally spaced rearwardly opening notches in its rear face for receiving the front faces of said vertical bars.

2. In a grille for a motor vehicle radiator, a plurality of laterally spaced substantially vertically extending bars, said vertical bars having a series of laterally aligned rearwardly opening notches in their rear faces, a laterally extending rear bar having a series of laterally spaced forwardly opening notches in its front face for registration in the notches of said vertical bars with portions of said rear bar adjacent the notches thereof engaging the sides of said vertical bars, and a laterally extending front bar having a series of laterally spaced rearwardly opening notches in its rear face for receiving the front faces of said vertical bars, with portions of said front bar engaging said rear bar portions.

3. In a grille for a motor vehicle radiator, a plurality of laterally spaced substantially vertically extending bars, said vertical bars having a series of laterally aligned rearwardly opening notches in their rear faces, a laterally extending rear bar having a series of laterally spaced forwardly opening notches in its front face for registration in the notches of said vertical bars with portions of said rear bar adjacent the notches thereof engaging the sides of said vertical bars, and a laterally extending front bar having a series of laterally spaced rearwardly opening notches in its rear face for receiving the front faces of said vertical bars with portions of said front bar engaging said rear bar portions, said front bar portions also engaging the sides of said vertical bars.

4. In a grille for a motor vehicle radiator, a plurality of laterally spaced substantially vertically extending bars, said vertical bars having a series of laterally aligned rearwardly opening notches in their rear faces, a laterally extending rear bar having a series of laterally spaced forwardly opening notches in its front face for registration in the notches of said vertical bars with portions of said rear bar adjacent the notches thereof engaging the sides of said vertical bars, and a laterally extending front bar having a series of laterally spaced rearwardly opening notches in its rear face for receiving the front faces of said vertical bars, with portions of said front bar engaging said rear bar portions in overlapping relationship therewith.

5. In a grille for a motor vehicle radiator, a plurality of laterally spaced substantially vertically extending bars, said vertical bars having a series of laterally aligned rearwardly opening notches in their rear faces, a laterally extending rear bar having a series of laterally spaced forwardly opening notches in its front face for registration in the notches of said vertical bars with portions of said rear bar adjacent the notches thereof engaging the sides of said vertical bars, and a laterally extending front bar having a series of laterally spaced rearwardly opening notches in its rear face for receiving the front faces of said vertical bars, with portions of said front bar engaging said rear bar portions in overlapping relationship therewith, said overlapping portions of said front and rear bars being welded together.

6. In a grille for a motor vehicle radiator, a plurality of laterally spaced substantially vertically extending bars, said vertical bars having a series of laterally aligned rearwardly opening notches in their rear faces, a laterally extending rear bar having a series of laterally spaced forwardly opening notches in its front face for registration in the notches of said vertical bars with portions of said rear bar adjacent the notches thereof engaging the sides of said vertical bars, and a laterally extending front bar having a series of laterally spaced rearwardly opening notches in its rear face for receiving the front faces of said vertical bars, said front bar being bent to provide a bead along its lateral front face.

7. In a grille for a motor vehicle radiator, a plurality of laterally spaced substantially vertically extending bars, said vertical bars having a series of laterally aligned rearwardly opening notches in their rear faces, a laterally extending rear bar having a series of laterally spaced forwardly opening notches in its front face for registration in the notches of said vertical bars with portions of said rear bar adjacent the notches thereof engaging the sides of said vertical bars, and a laterally extending front bar having a series of laterally spaced rearwardly opening notches in its rear face for receiving the front faces of said vertical bars, said front and rear bars comprising relatively thin plates of metal.

8. In a grille for a motor vehicle radiator, a plurality of laterally spaced substantially vertically extending bars, said vertical bars having a series of laterally aligned rearwardly opening notches in their rear faces, a laterally extending rear bar having a series of laterally spaced forwardly opening notches in its front face for registration in the notches of said vertical bars with portions of said rear bar adjacent the notches thereof engaging the sides of said vertical bars, and a laterally extending front bar having a series of laterally spaced rearwardly opening notches in its rear face for receiving the front faces of said vertical bars, said front and rear bars comprising relatively thin plates of metal, said front bar being bent to provide a relatively high bead along its lateral front face.

9. In a grille for a motor vehicle radiator, a plurality of laterally spaced substantially vertically extending bars, said vertical bars having a series of laterally aligned rearwardly opening notches in their rear faces, a laterally extending rear bar having a series of laterally spaced forwardly opening notches in its front face for registration in the notches of said vertical bars with portions of said rear bar adjacent the notches thereof engaging the sides of said vertical bars, and a laterally extending front bar having a series of laterally spaced rearwardly opening notches in its rear face for receiving the front faces of said vertical bars, and a vertically extending central bar, one end of said front bar extending laterally and rearwardly from said central bar.

10. In a grille for a motor vehicle radiator, a plurality of laterally spaced substantially vertically extending bars, said vertical bars having a series of laterally aligned rearwardly opening notches in their rear faces, a laterally extending rear bar having a series of laterally spaced forwardly opening notches in its front face for registration in the notches of said vertical bars with portions of said rear bar adjacent the notches thereof engaging the sides of said vertical bars, a laterally extending front bar having a series of laterally spaced rearwardly opening notches in its rear face for receiving the front faces of said vertical bars, a vertically extending central bar, one end of said front bar extending laterally and rearwardly from said central bar to provide a space between said central and front bar, and a channeled finish bar attached to the front of said central bar and having a portion thereof in the last said space.

11. In a grille for a motor vehicle radiator, a plurality of laterally spaced substantially vertically extending bars, said vertical bars having a series of laterally aligned rearwardly opening notches in their rear faces, a laterally extending rear bar having a series of laterally spaced forwardly opening notches in its front face for registration in the notches of said vertical bars with portions of said rear bar adjacent the notches thereof engaging the sides of said vertical bars, a laterally extending front bar having a series of laterally spaced rearwardly opening notches in its rear face for receiving the front faces of said vertical bars, said front bar being bent to provide a bead along its lateral front face, and a finish bar secured to said bead.

12. A grille comprising a series of parallel bars formed of sheet metal and of a U-shaped cross section, a cross bar comprising two members, one formed with a horizontal flange portion with a bead or head at its front edge and being provided with a series of slots opening through its rear edge and extending to said head for receiving said parallel bars, with the bend in the U lying adjacent to said head and the other of said members lying adjacent and secured to said horizontal flange and forming a closure for the slots therein.

13. A grille comprising a series of parallel bars formed of sheet metal and of a U-shaped cross section, a cross bar comprising two members, one formed with a horizontal flange portion with a bead or head at its front edge and being provided with a series of slots opening through its rear edge and extending to said head for receiving said parallel bars with the bend in the U lying adjacent to said head, and the other member lying adjacent to said horizontal flange and closing the slots therein, the said members being welded to each other.

ALBERT B. WERDEHOFF.